Patented June 3, 1930

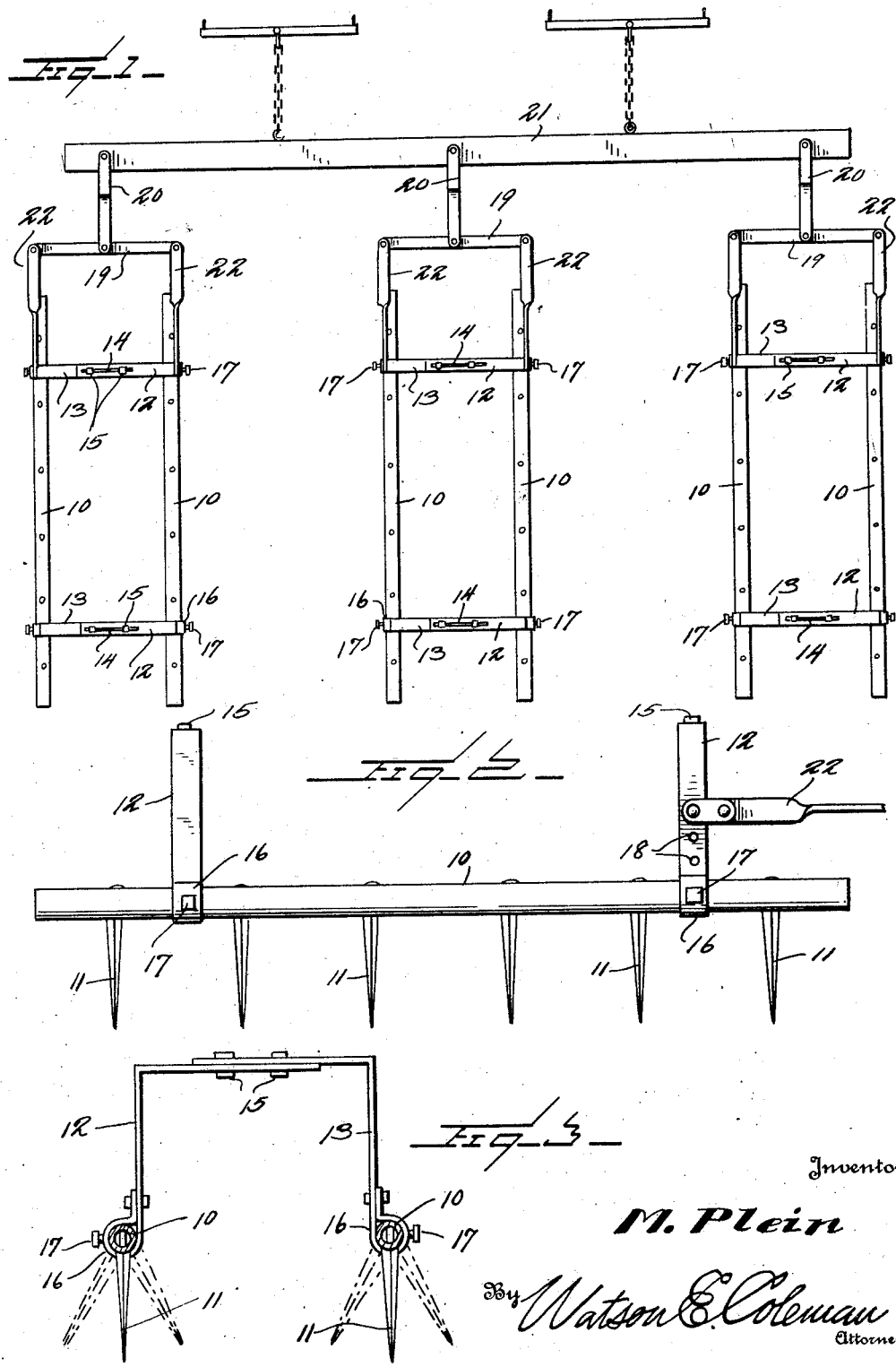

1,761,491

UNITED STATES PATENT OFFICE

MATHIAS PLEIN, OF ROSELAND, NEBRASKA

LISTER CORN HARROW

Application filed May 12, 1928. Serial No. 277,259.

This invention relates to lister corn harrows, and particularly to harrows of this character so constructed that a set of harrow teeth will be disposed on each side of a corn row and operate on lines on each side of the row to cultivate the soil and throw the earth toward the corn, this aplication being a continuation in part of my application, Serial No. 183,883, filed April 14, 1927.

One of the objects of the present invention is to provide a very simple and cheaply constructed harrow which may be used in gangs of two or more or which may be used singly, that is, a harrow for a single row, and which is so constructed that the pair of bars supporting the harrow teeth may be expanded or contracted to increase or decrease the distance between these sets of harrow teeth.

A further object is to provide means whereby the harrow teeth may be set to extend outward and downward, directly downward, or downward and inward.

A still further object is to provide a harrow which will thoroughly pulverize and weed and at the same time draw the dirt toward the listed corn.

Other objects will appear in the course of the following description.

My invention is illustrated in the accompanying drawing, wherein:—

Figure 1 is a top plan view of a harrow constructed in accordance with my invention;

Figure 2 is a side elevation of one of the tooth-supporting bars and its draft connections;

Figure 3 is a cross sectional view through the tooth-supporting bars showing a yoke in elevation and showing in dotted lines the manner in which the tooth-supporting bars may be adjusted to change the angle of the teeth.

In Figure 1, I have shown a set of three harrows. Each harrow consists of a pair of longitudinally extending tubular bars, for instance, formed of steel pipe, designated 10. These bars carry upon them at spaced intervals the downwardly extending teeth 11, which teeth are radial with reference to the bar 10 and which teeth may be square or triangular in cross section or may have any other desired shape and are tapered to a point.

The harrow bars 10 are held in spaced relation by transversely extending arches formed in two sections 12 and 13. Each section is angular in form to provide a horizontal portion and a vertical portion. The horizontal portions of the two sections 12 and 13 overlap each other and one of these horizontal portions is slotted, as at 14, and the other is provided with bolts 15 which engage in this slot, or both sections may be slotted and the bolts pass through both slots so as to hold the two sections in transversely adjusted position, that is, to hold the two sections in adjusted position after they have been shifted relative to each other transversely of the longitudinal axis of the harrow as distinguished from adjusting these sections parallel to the longitudinal axis of the harrow. In other words, these sections 12 and 13 are transversely extensible or contractible. The lower end of each vertical portion of the section 12 or 13 is formed with a collar or eye 16 through which a set screw 17 passes. There are two of these arches disposed, one adjacent the rear ends and the other adjacent the forward ends of the bars 10, and by this means the bars may be shifted and held nearer to or further from each other and thus the width of the harrow be adjusted.

The vertical portions of the two sections 12 and 13 of the forward arch are perforated at a plurality of points, as at 18, and pivotally connected by bolts to this arch is a U-shaped draft member 19 which is provided with a clevis 20, this clevis partially embracing a transverse draw bar 21 and being pivoted thereto. The draft device 19 consists of a transverse bar and two rearwardly extending links 22, these links being pivoted to the transverse bar and at their rear ends pivoted to the forward arch. Thus these links will permit the lateral expansion of the harrow or contraction thereof. The draw bar 21 is connected to any suitable draft means but, as shown, is adapted to be connected to two whiffletrees whereby two draft animals may be applied thereto. Where there are four harrows attached to the draw bar 21, three horses will be probably used and under these circumstances a seat may be applied to the two inner harrows upon which the driver may ride. Of course, it will be understood that two harrows may be used attached to a draw bar 21 or even one harrow may be used attached to any draft appliance.

It will be noted from Figure 3 that the pipes 10 may be rotated within the eyes 16 so as to dispose the teeth in an outwardly and downwardly projected position, in a downwardly and inwardly projected position, or in a vertically disposed position, and after these tubular bars 10 are so set they may be held in any adjusted position by the set screws 17. When the teeth are set outward and downward, they cut along the ridge of the rows, which tends to loosen the dirt and pulverize it on the ridge. When the teeth are set inward at about an angle of 70° they will work the ground to about 2" and raise the ground toward the corn.

Where the teeth are set vertically, the teeth will only pulverize and weed at the bottom of the listed row and around the corn. The draw iron 19 is so constructed that it will hold the harrow in a level position and also hold it from upsetting on turning.

I claim:—

1. A corn harrow of the character described comprising a pair of longitudinally extending bars, arches upon the ends of which said bars are mounted, the arches being transversely adjustable and the bars having downwardly extending radial harrow teeth and being rotatably adjustable in the arches around the longitudinal axis of the bars whereby the harrow teeth may be disposed either vertically or laterally inclined.

2. A harrow of the character described comprising two longitudinally extending bars cylindrical in cross section and having harrow teeth projecting radially downward therefrom, transversely extending arches having eyes at their ends through which the bars pass and in which the bars have rotary movement around the longitudinal axis of the bars, means for holding the bars adjusted in said eyes with the teeth at any desired angle to the horizontal, and draft means applied to one of said arches.

3. A harrow of the character described comprising two longitudinally extending bars cylindrical in cross section and having radial harrow teeth projecting downward therefrom, transversely extending arches having eyes at their ends through which the bars pass and in which the bars have rotary movement around the longitudinal axis of the bars, means for holding the bars rotatively adjusted in said eyes with the teeth at any desired angle to the horizontal, and draft means applied to one of said arches, the arches being transversely adjustable independently of each other to thereby increase or decrease the distance between the longitudinal bars.

In testimony whereof I hereunto affix my signature.

MATHIAS PLEIN.